US007853081B2

(12) United States Patent
Thint

(10) Patent No.: US 7,853,081 B2
(45) Date of Patent: Dec. 14, 2010

(54) IDENTIFYING DATA PATTERNS

(75) Inventor: Marcus Thint, Boca Raton, FL (US)

(73) Assignee: British Telecommunications public limited company, London (GB)

( * ) Notice: Subject to any disclaimer, the term of this patent is extended or adjusted under 35 U.S.C. 154(b) by 925 days.

(21) Appl. No.: 11/730,572

(22) Filed: Apr. 2, 2007

(65) Prior Publication Data

US 2008/0240566 A1    Oct. 2, 2008

(51) Int. Cl.
*G06K 9/00* (2006.01)
*G06K 9/62* (2006.01)

(52) U.S. Cl. ........................................ 382/181; 382/224

(58) Field of Classification Search ................. 382/159, 382/181, 190, 197, 224, 228
See application file for complete search history.

(56) References Cited

U.S. PATENT DOCUMENTS

| | | | |
|---|---|---|---|
| 6,137,909 A * | 10/2000 | Greineder et al. ........... | 382/190 |
| 6,961,736 B1 | 11/2005 | Amirghodsi | |
| 7,308,133 B2 * | 12/2007 | Gutta et al. ................. | 382/159 |
| 7,634,140 B2 * | 12/2009 | Okajima et al. ............. | 382/224 |
| 2005/0238238 A1 * | 10/2005 | Xu et al. ...................... | 382/224 |

OTHER PUBLICATIONS

Hearst, "Support Vector Machines", IEEE Intelligent Systems, pp. 18-28, Jul./Aug. 1998.

Juang et al., "Hidden Markov Models for Speech Recognition", Technometrics, Aug. 1991, vol. 33, No. 3.
Boden A Guide to Recurrent Neural networks and Backpropagation, in the Dallas Project. Report from the NUTEK-supported project AIS-8: Application of Data Analysis with Learning Systems, 1999-2001. Hoist, A. (ed.), SICS Technical Report T2002:03, SICS, Kista, Sweden.
Sampath et al., "Speech Recognition Using Neural Network", University of Moratuwa, Sri Lanka, 2003.
Schwarz, "Data-Driven Concatenative Sound Synthesis, " Ph.D. Thesis in Acoustics, Computer Science, Signal Processing Applied to Music, Academie de Paris, Pierre et Marie Curie Ecole Doctorale d'Informatique, Jan. 2004.
Kohonen, "The Self-Organizing Map", Proceedings of the IEEE, vol. 78, No. 9, Sep. 1990.
Somervuo, "Self-Organizing Maps for Signal and Symbol Sequences", Ph. D. Dissertation, Finish Academy of Technology, Dec. 2000.
Myers et al., "A Comparative Study of Several Dynamic Time-Warping Algorithms for Connected-Word Recognition", Copyright 1981 American Telephone and Telegraph company, The Bell System Technical Journal, vol. 60, No. 7, Sep. 1981.

* cited by examiner

*Primary Examiner*—Daniel G Mariam
(74) *Attorney, Agent, or Firm*—Nixon & Vanderhye P.C.

(57) ABSTRACT

Methods and systems for identifying data patterns from data comprising at least one data object, said data having at least one existing pattern class associated therewith, said data object being represented by a base feature vector, at least one of said base feature vectors having a structure of higher-level and lower-level feature vectors such that at least one element of a higher-level feature vector is itself a lower-level feature vector.

17 Claims, 10 Drawing Sheets

Fig. (3a) Sample variable-length feature vector with a nested structure

```
<record>
    customerInfo = { custID, name, address, city, state, phone }
    deviceInfo = { deviceID, deviceDescription, model, version, configData {} }
    problemDescription
    channel
    repairNote
    priorComplaints = {}
</record>
```

Fig. (3b) Specification format after processing by Feature Specification Capture module

```
BaseFeatureVector_name = SupportData
BaseFeatureVector_length = 6
SupportData_NumArrays = 3
SupportData_E4 = problemDescription, 2.0
SupportData_E5 = channel, 0.0
SupportData_E6 = repairNote, 1.0

SupportData_E1_name = customerInfo
customerInfo_length = 6
customerInfo_NumArrays = 0
customerInfo_weight = 0.0
customerInfo_E1 = custID
customerInfo_E2 = name
customerInfo_E3 = address
customerInfo_E4 = city
customerInfo_E5 = state
customerInfo_E5 = phone SupportData_E2_name = deviceInfo
deviceInfo_length = 5
deviceInfo_NumArrays = 1
deviceInfo_weight = 2.0
deviceInfo_E2 = deviceID
deviceInfo_E3 = deviceDescription
deviceInfo_E4 = model
deviceInfo_E5 = version SupportData_E3_name = priorComplaints
priorComplaints_length = -1 (unknown)
priorComplaints_NumArrays = 0
priorComplaints_weight = 0.0 deviceInfo_E1_name = configData
configData_length = -1 (unknown)
configData_NumArrays = 0
```

Figure 3 configData.txt

<record>
inputV = 108
snrP1 = 16
snrUSB1 = 32
currentJ2 = 1.3
snrP2 = 11
snrUSB2 = 35
ampV = 12.2
snrF1 = 35
release = 050423
impedenceJ5 = 245
snrF2 = 38
patch = 3.1
</record> priorComplaints.txt

<record>
problem_1 = HP monitor failure – poor image quality
problem_2 = M632 mobile phone cannot receive text messages
problem_3 = Seagate hard disk drive– no R/W response and boot failure
</record> deviceInfo.txt

<record>
deviceID = SuperHub300
deviceDescription = hub to connect phones, faxes, and computers
model = 320A
version = 1.2
</record>

SupportData.txt

<record>
problemDescription = I'm having problems with long distance calls after connecting to SuperHub300. Calls keep dropping off right after connection – rings once.

channel = CC_Atlanta repairNote= Customer installed patch 3.1 two days ago, which caused low SNR on phone ports. Reinstallation of older path 2.8 fixed the problem.

</record> customerInfo.txt

<record>
custID = 032756
name = H.W. Smith
address = 321 Willow St.
city = Silver Spring
state = Maryland
phone = 301-567-5432
</record>

Figure 4

Data set #1

<record> customerInfo = { custID = 032756
 name = H. W. Smith
 address = 321 Willow St.
 city = Silver Spring
 state = Maryland
 phone = 301-567-5432 } deviceInfo = { deviceID = SuperHub300;
 deviceDescription = hub to connect
  phones, faxes, and computers
 model = 320A
 version = 1.2
 configData = { inputV = 108
  snrP1 = 16
  snrUSB1 = 32
  currentJ2 = 1.3
  snrP2 = 11
  snrUSB2 = 35
  ampV =12.2
  snrF1 = 35;
  release = 050423
  impedenceJ5 = 245
  snrF2 = 38
  patch = 3.1 } } problemDescription = I'm having problems
with long distance calls after connecting to
SuperHub300. Calls keep dropping off
right after connection – rings once.

channel = CC_Atlanta repairNote = Customer installed patch 3.1
two days ago, which caused low SNR on
phone ports. Reinstallation of older path 2.8
fixed problem.

</record>

Data set #2

<record> customerInfo = { custID = 089537
 name = M. Galler
 address = 2235 N. Lakewood Dr.
 city = Indianapolis
 state = Indiana
 phone = 234-886-3211 } deviceInfo = { deviceID = Trimline150
 deviceDescription = single line, wall
  phone
 model = 150
 version = 2
 configData = { trV = 112
  loopI = 0.22 }
 } problemDescription = no dial tone channel = CC_Ohio repairNote = replace handset-to-base
cord </record>

Data set #3

<record> customerInfo = { custID = 019683
 name = J. Wolsby
 address = 445 Nappa Court
 city = Fredricksburg
 state = VA
 phone = 609-298-3347 } deviceInfo = { deviceID = SuperHub300
 deviceDescription = hub to connect
  phones, faxes, and computers
 model = 320A
 version = 1.0
 figData = { inputV = 112
  nrP1 = 12
  nrUSB1 = 29
  urrentJ2 = 1.4
  nrP2 = 13
  nrUSB2 = 36
  ampV =11.6
  snrF1 = 31
  release = 050423
  impedenceJ5 = 265
  snrF2 = 34
  patch = 3.1 } } problemDescription = cannot make long
distance calls on my line 2 recently channel = email_NewYork repairNote = line 2 was connected to port #1
on 300. Revert to patch 3.0 and works fine.

</record>

Figure 5

ESM computations

- For the inner-most feature vector (configData)

- ESM between pattern class P1 (containing data set #1) and data set #2 is 0.0, since no matching parameter from data set #2 is found in P1.

- ESM between pattern class P1 and data set #2 is computed as follows:

ESM_configData_1_1 = 1.0 − | (112-108)/108 | = 0.963
  ESM_configData_2_1 = 1.0 − | (12-16)/16 | = 0.75
  ESM_configData_3_1 = 1.0 − | (29-32)/32 | = 0.906
  ESM_configData_4_1 = 1.0 − | (1.4-1.3)/1.3 | = 0.923
  ESM_configData_5_1 = 1.0 − | (13-11)/11 | = 0.818
  ESM_configData_6_1 = 1.0 − | (36-35)/35 | = 0.971
  ESM_configData_7_1 = 1.0 − | (11.6-12.2)/12.2 | = 0.951
  ESM_configData_8_1 = 1.0 − | (31-35)/35 | = 0.886
  ESM_configData_9_1 = 1.0 − | (050423-050423)/050423 | = 1.0
  ESM_configData_10_1 = 1.0 − | (265-245)/245 | = 0.918
  ESM_configData_11_1 = 1.0 − | (34-38)/38 | = 0.895
  ESM_configData_12_1 = 1.0 − | (3.1-3.1)/3.1 | = 1.0

VSM_configData_1 = (10.981)/12 = 0.915

Figure 8

VSM of BaseFeatureVector

**Merging the *VSM_configData_1* to parent vectors:**

- *VSM_deviceInfo_1* = (1.0 + 1.0 + 1.0 + 0.833 + 0.915)/5 = 0.949, as deviceID, deviceDescription, and model number are exact matches.

- *ESM_repairNote_1* requires applying method described in Figure 10 below:
  { customer, install, patch, 3.1, two, days, ago, ⟷ { line, 2, connect, phone, port, #1, 300, caused, low, SNR, phone, port, re-install,     revert, patch, 3.0, works, fine } older, patch, 2.8, fixed, problem}

ESM1 = (3/12 + 3/18) / 2 = 0.21

- Similarly, *ESM_problemDescription_1* = 0.28

- Noting that weights for *customerInfo* and *channel* are 0.0 as specified in Figure 3.0 above. (To detect similar problem types, the reporting customer and channel used are not important).

VSM_SupportData_1 = ( (2.0)(0.949) + (2.0)(0.28) + 0.21 ) / 3 = 0.819

- If ClassThreshold = 0.6, for example, data set #3 is sufficiently similar to P1 that it is assigned membership to P1 class.

Figure 9

Process C2

IDENTIFYING DATA PATTERNS

TECHNICAL FIELD

The present invention relates to methods and systems for identifying data patterns. More specifically, but not exclusively, aspects of the present invention relate to methods and systems in the field of automated pattern recognition by machines, and/or to methods and systems for identifying data patterns from heterogeneous input data which may include numerical data, textual data such as natural language text, or a combination thereof.

BACKGROUND TO THE INVENTION

Automated pattern recognition systems compare the key features of input data with key features of standard/expected object(s) to generate output decisions. "Patterns" cover a wide range of entities such as typed or hand-written characters, pictures and faces, weather (temperature, wind, pressure measurements), finger prints and iris scans, sounds and voice (waveforms), grammar and text sequence, and many other types of data that can be sensed/acquired and processed. The key features may be encoded according to familiar measurement metrics or via abstract mathematical transformations.

Typically, in pattern classification systems, a set of features (stored as arrays or vectors) are extracted via a predefined process on both prototype/training samples and new input data. These feature vectors may include numbers or characters representing physical attributes (measurements), time-dependent attributes like speech articulations (phonemes), digitally encoded bit streams, or mathematically encrypted patterns. The feature vectors may be (i) compared to ideal/desired values as in identification, inspection, and quality control applications, or (ii) compared against each other as in data clustering applications, or (iii) compared against m other feature vectors as in classification applications. In all cases, these methods require fixed-length feature vectors—i.e. feature vectors with n elements are compared to other n-length feature vectors with the same ordering of elements, in order to compute a meaningful similarity (or distance) metric. [See refs 1-6 below]

In some applications, a fixed number of features per sub-sample generates a variable-length feature vector due to a variable number of sub-samples for each input pattern. When variable-length feature vectors have been encountered, solutions have involved a conversion of feature vectors to a common fixed-length reference before comparison operations are invoked. For example, when comparing color images, the size/length of feature vectors may vary (even when size and resolution of photos are the same) depending on the complexity and richness of the colors in different regions of a picture. A common solution is to map the feature vectors to a global color table, (thereby generating a fixed-length feature vector) and compute standard vector distances or similarity metrics thereafter. [See ref 7 below]

Other cases where variable-length feature vectors are encountered include time-variant problem domains such as speech recognition, on-line handwriting recognition, time-series data and click-stream analysis in web-mining. In these cases solutions involve application of machine learning algorithms consisting of hidden Markov models [See ref 8 below], recurrent neural networks [See ref 9 below], and dynamic time warping [See ref 10 below] to find a warping function which optimally matches two (or more) feature vector sequences such that a time-normalized distance between the variable-length feature sequences can then be calculated. It is also known that dynamic programming methods [See ref 11 below] can also be used for computing time- or length-normalized distances between numeric or symbolic sequences.

In the methods set out in references [7] to [14] below, which are believed to represent the most relevant prior disclosures, the problems involve variable-length feature vectors, and the solutions (in refs [7] to [13]) include some type of normalization to a reference/global vector, or conversion of the variable-length feature vectors to fixed-length representations. P. Somervuo [ref 14] does not convert variable-length symbol sequences to fixed-length feature vectors in his research, wherein he investigated learning of symbol sequences by use of self-organizing maps (SOMs). SOM are well suited for data clustering, visualization of large data sets, and initializing (data pre-processing) for pattern recognition tasks, but are not suited for targeted/customized pattern detection [See ref 15 below].

Other than reference [7], all of the documents referred to above deal with variable-length feature vectors from temporal or sequential (time-variant) data. The document believed to be of most relevance to problems relevant to the present invention is reference [7] (mapping to a global reference vector) which the approach set out in this document is not always efficient or practical as described below.

In problem domains that deal with heterogeneous data and natural language text, there is no standard/global basis vector to serve as a normalization base. For example, a feature element describing device/product configurations has no "global table" to use as a normalization reference, as there are many different types of products yielding different numbers and types of configuration parameters. Similarly, a feature element comprising a "Customer Complaints" or a "Frequently Asked Questions" (FAQ) list has no standard reference vector, as natural language descriptions are unstructured, and complexities of products vary widely. Arbitrary limitations on number of parameters or simplified analysis (e.g. on some maximum number of keywords) lead to loss of information, context, and semantics. Padding of feature vectors to an arbitrary maximum length introduces computing memory and processing inefficiencies. System designers have resorted to these artificial constraints on the past since alternative solutions have not been available.

SUMMARY OF THE INVENTION

According to a first aspect of the present invention, there is provided a method for identifying data patterns from data comprising at least one data object, said data having at least one existing pattern class associated therewith, said data object being represented by a base feature vector, at least one of said base feature vectors having a structure of higher-level and lower-level feature vectors such that at least one element of a higher-level feature vector is a lower-level feature vector; said method comprising steps of:

(a) deriving a pattern class prototype in respect of the or each existing pattern class;
(b) creating a new pattern class in respect of a data object; and
(c) deriving a pattern class prototype in respect of said new pattern class, for the or each of said existing pattern classes:
  (d1) determining, in respect of elements of a higher-level feature vector, an Element Similarity Measure indicative of a measure of similarity between elements of one or more lower-level feature vectors thereof and corresponding elements of a pattern class prototype of said existing pattern class; and
  (d2) determining, in dependence on said Element Similarity Measures, a Vector Similarity Measure indicative of a measure of similarity between said higher-level feature vector and a corresponding vector of a pattern class prototype of said existing pattern class;
(e) determining, in dependence on Vector Similarity Measures determined in respect of each of said existing pattern classes and according to predetermined criteria, whether or not said data object is a member of one of said existing pattern classes;
(f1) in the event of a determination that said data object is a member of an existing pattern class, adding said data object to a set of members of said existing pattern class;
(f2) in the event of a determination that said data object is not a member of an existing pattern class, generating a new pattern class and adding said data object to a set of members of said new pattern class; and
(g) identifying any new pattern class so generated to be indicative of a new data pattern.

According to a second aspect of the present invention, there is provided a system arranged to perform the above method Preferred embodiments of the present invention are capable of solving pattern recognition problems with variable-length feature vectors in the time-invariant domain.

Preferred embodiments of the invention may provide solutions for automated pattern detection, particularly for applications with heterogeneous input data with mixed numerical and natural language text. Whereas prior art methods require normalization of variable-length feature vectors to a fixed-length reference, some features have no standard/global basis vector to serve as a normalization base. For example, a feature element describing device/product configurations has no "global table" to use as a normalization reference, as there are many different types of products yielding different number and types of configuration parameters. Similarly, a feature element for a customer complaint, problem description, or contact center dialog has no standard reference vector, as natural language descriptions are unstructured.

Preferred embodiments of the present invention may lead to advantages including any, or any combination of the following: (i) enabling solutions to pattern detection problems involving variable-length feature vectors without normalization to a global reference vector, information loss (via feature vector truncation), and computational inefficiencies (via feature vector padding); (ii) supporting processing of variable-length feature vectors in a nested configuration; and (iii) providing a consistent framework and methodology for problems ranging from low to high complexity. All three factors, in particular the contributions of advantages (i) and (ii) offer practical solutions to problems which may be encountered when dealing with heterogeneous input with mixed numeric and textual data.

Preferred embodiments of the present invention offer a generalized framework and method for automated pattern detection with variable-length feature vectors, also supporting a seamless processing of nested feature vectors. It is especially suitable for complex problem domains but is also applicable to simple problems. FIG. 1, reproduced here as well as in the appended drawings, is intended to assist in providing an understanding of advantages of embodiments of the present invention over the prior art.

(1*a*) Generalized feature vector:

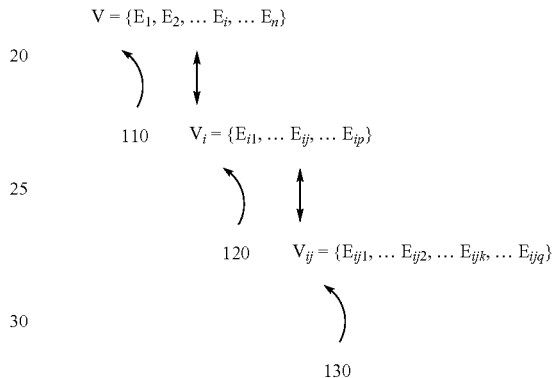

(1*b*) Required transformations by prior-art:
  Specify subset (or pad) $V_{ij}$ such that $V_{ij}=\{E_{ij1}, E_{ij2}, \ldots E_{ijm}\}$, $m<q$ (or $m>q$)
  Pad (or specify subset $V_i$ such that $V_i=\{E_{i1}, E_{ij}, \ldots E_{ir}\}$, $r>p$ (or $r<p$)
  Resulting $V=\{E_1, E_2, \ldots E_s\}$, where $s=m+(r-1)+(n-1)$ and V incurs information loss where subset/truncation operations are applied, and computing inefficiencies where padding of elements are applied.

Text from FIG. 1: Abstract Representation of Nested Feature Vectors and Required Transformations By Prior-art In FIG. 1, part (1*a*) depicts a feature vector V in a symbolic form, where the base vector contains n elements, of which one component $E_i$ is a p-element vector $V_i$ whose sub-element $E_{ij}$ is yet another vector $V_{ij}$ with q elements. The fact that V results in a variable-length vector is due to the fact that values for p and q are not fixed for all possible input data associated with the application. For example, one problem where this type of feature vector may arise naturally is when analyzing a customer support information vector V with a subvector $V_i$ about customer complaints, which in turn contains a vector $V_{ij}$ about products owned and product configurations used by the customer. Some customer complaint descriptions may be short while others may be very lengthy (variable p) and some products may have just a few configurations while a complex product may have many parameters (variable q). In this example, V is a variable-length feature vector with nested feature vectors, comprising heterogeneous data mixed with numerical and natural language descriptions.

FIG. 1, part (1b) depicts the required transformations for processing with prior-art techniques. The nested sub-vectors $V_{ij}$ and $V_i$ must be successively incorporated ("flattened") into the base vector V—which is not a significant disadvantage in itself. However, during this process, the variable-length feature vectors must be converted into fixed-length counterparts, by either imposing a heuristic maximum length via subset selection, truncation, or padding with zero/identity elements. This latter process induces information loss or computing inefficiencies. With reference to the customer support information vector above, an artificial limit on number of device parameters may lead to a mis-diagnosis if a key parameter was omitted, or computing inefficiencies are incurred if (for example) 95% of the vectors are padded with zero elements to a length over 50 times their norm, just to accommodate the 5% of cases with a large number of parameters.

With reference to the same customer support information vector, (i) an artificial limit on the string length of customer complaint description may also result in a mis-diagnosis if important phrases are omitted, (ii) selective processing using only certain keywords may lead to loss of contextual and semantic information, and (iii) creating a normalized vector with every possible word of a language as a reference vector would incur computing inefficiencies as only a tiny percentage of the reference vector would be populated for nearly all input data.

Preferred embodiments of the present invention enable the original feature vector to be preserved in its naturally occurring state (which may be as shown in FIG. 1, part (1a) with sub-vectors in a nested configuration, for example) and to be processed without incurring computing inefficiencies or loss of information. Note that FIG. 1, parts (1a) and (1b) depict a three level feature vector structure for clarity—methods according to embodiments of the present invention can be applied to arbitrarily complex structures of nested, variable-length feature vectors, as long as the innermost feature vector contains all scalar elements and terminates the nesting structure.

BRIEF DESCRIPTION OF THE DRAWINGS

Preferred embodiments of the present invention will now be described with reference to the appended drawings, in which:

FIG. 3 shows a sample variable-length feature vector and its possible specification format after processing by the Feature Specification Capture module of FIG. 2;

FIG. 4 shows a sample data file structure for specified feature vectors in FIG. 3;

FIG. 5 shows a sample sequence of three data sets;

FIG. 8 illustrates example Element Similarity Measure (ESM) and Vector Similarity Metric (VSM) computation for sample data;

FIG. 9 illustrates merging and computing a VSM of a base feature vector;

DESCRIPTION OF PREFERRED EMBODIMENTS OF THE INVENTION

Before describing the functionality of preferred embodiments of the invention, an example high-level target application will briefly be described in order to assist in providing an understanding of possible types of "pattern detection" problems that preferred embodiments of the invention may be configured to solve.

Consider a call centre where problem reports are streaming in. In a large company with a variety of products where different combinations, configurations, and uses of those products are possible, the first few hundred reports may all represent different types of faults. But over 20 time, some repeating faults (albeit not exact duplicate descriptions) will emerge, for similar products under similar configurations, and similar usage. Some of these faults may be widespread (e.g. in the fields of information technology and internet service provision, it may be that one aspect of broadband service degrades if users apply a particular security patch), so it is desirable to detect such emergent fault patterns after the first 10 or 20 reports (and possibly broadcast a warning or a fix) before thousands of people start to complain.

From a technical perspective, as each complaint, which can be regarded as a data object, passes, the system must decide if it belongs (i.e. if it is similar enough) to an existing pattern class or if a new pattern class needs to be created. The system will also accumulate similar data objects in the same pattern class (bin). When a criterion (e.g. threshold specifying statistical significance) is satisfied, the emergent pattern is detected and subsequent procedures may be invoked.

Of course, potentially problematic issues include: (i) the pattern the system is trying to detect is not defined a-priori (i.e. the result is entirely data driven); and (ii) comparing the similarity of these data objects (or underlying feature vectors) when their descriptions contain irregular, unstructured content.

Methods and systems according to preferred embodiments of the invention will now be described with reference to the above figures.

Figure 1:
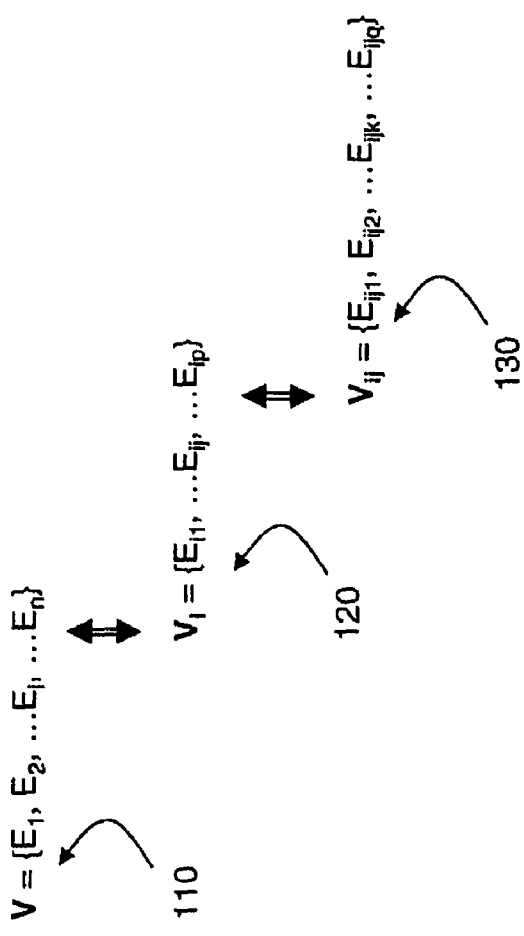
FIG. 1 is an abstract representation of nested feature vectors and required transformations using prior art methods.

In the early stages of an automated pattern recognition system design, the information to be processed is identified (e.g. faces from photographs, characters from handwritten addresses, etc.) and feature selection is completed. In some problem domains, the features may occur as nested, variable-length vectors depicted in FIG. 1, part (1a) (reproduced in the text above).

For problems that involve temporal or sequential, time-variant data, prior art methods such as hidden Markov models [see ref 8], recurrent neural networks [see ref 9], and dynamic time warping [see ref 10] may be employed.

For problems involving time-invariant variable-length feature vectors, preferred embodiments of the invention may provide a generalized framework and method for pattern analysis.

Figure 2:
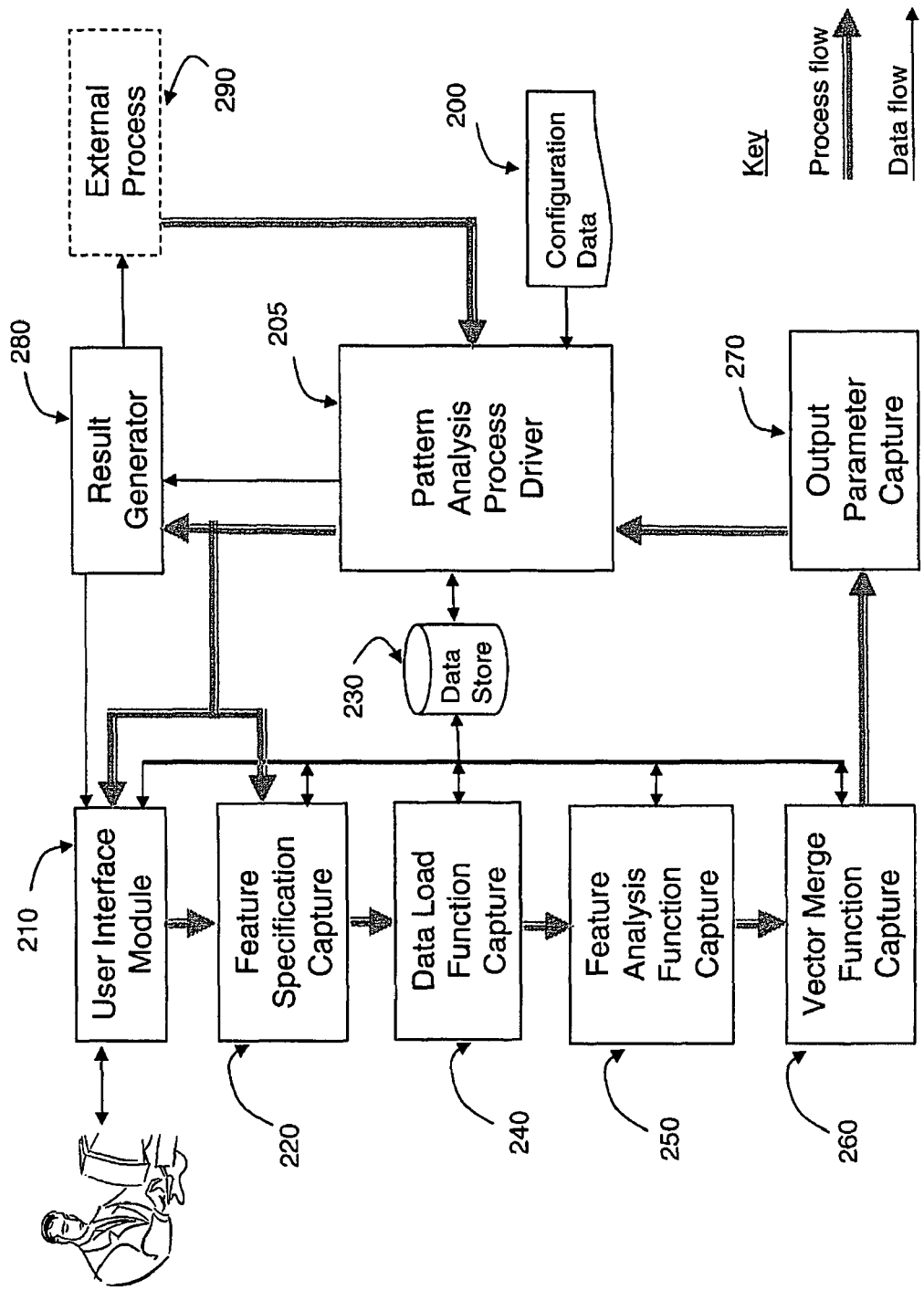
FIG. 2 illustrates functional components, interactions, processing and data flow in a system arranged to perform pattern recognition according to an embodiment of the invention.

A preferred embodiment of a system according to the invention will be described with reference to FIG. 2. This apparatus (i) automatically configures the pattern analysis system based on a user's problem description via text Configuration file 200 or interactive input via the User Interface Module 210, and (ii) performs pattern analysis using default (supplied) methodologies or special user-defined methodologies.

The Pattern Analysis Process Driver 205 starts the User Interface Module 210 to display operation status information. If a Configuration file 200 is found an application is set up using the specifications in that file; else, set-up data is captured via interactive queries to the user via the User Interface Module 210. The first stage of operation captures the feature vector structure, its element list, and relative importance (weights) of the feature elements. This process is controlled by the Feature Specification Capture module 220 and involves:

Step (1a): Specification of the BaseFeatureVector V 110 including its name, its length, number of arrays, and properties of its scalar elements. For each element in V, its name and optionally its weight value (indicating relative importance) may be assigned. If weight values are not assigned, a pre-designated default value is used. In one preferred implementation, a default weight value of 1.0 is used, and non-weighted features are considered equally important. A weight value of 0.0 indicates that element or vector should be omitted in the similarity computation process.

Step (1b): For each element in V that is an array, the corresponding elements must be defined for each SubFeatureVector $V_i$ 120 as in step (1a) above. For each element in $V_i$ that is an array, the corresponding elements must be defined as in step (1a) above, and this procedure must be repeated recursively for subsequent array elements. When the length of the array is not known a priori (i.e. variable) a value of −1 may be assigned. (Since length of an array is normally >=0, the "−1" may thus serve as a special flag to the Feature Specification Capture module 220 to use a resizeable-array data type for this element. (Note that although FIG. 1, part (1a) depicts only one "layer" of SubFeatureVector $V_i$ multiple levels of nesting may be supported by appropriate embodiments of the invention.)

Step (1c): At the completion of step (1b) above, the final vectors represented by $V_{ij}$ 130 contain only scalar objects (although their length may not be fixed). The feature specification data is stored in a Data Store 230 for subsequent reference.

Referring now to FIG. 3, FIG. 3a illustrates a sample variable-length feature vector with nested structure, and FIG. 3b shows its specification after applying steps (1a) and (1b) above.

During the second stage, the data loading procedure for each array (feature vector) is established by the Data Load Function Capture module 240. According to one preferred version of module 240, only the mode of data input and associated parameters need to be specified. For example, if data is acquired through a computer port, a designated port number and communication protocol must be specified, or if data is acquired from a file, the directory path for that file is requested. Data files and format for each feature vector conform to a predetermined specification. In one preferred version of module 240, data files are identified using the same name as the feature vector (provided in stage 1, i.e. steps 1a, 1b and 1c above) followed by a ".txt" file extension, and each data record is delimited by XML-style tags such as "<record>" and "</record>". Element data is provided in a <parm name>=<value> pair format. If the data is streamed via a computer port, the same format should be used. Sample data files for the example in FIG. 3 are shown in the table of FIG. 4.

If a user prefers to supply special/customized function(s)/ program(s) to fetch and load data into feature vectors, the system may allow for association of those functions with each named feature vector. As the Data Load Function Capture module 240 processes each feature vector, selecting a "user-defined" option will request the function name and assign an appropriate pointer or interface to an associated procedure. (The user supplied special program code is assumed to be developed and tested independently.)

The third stage stipulates the feature analysis functions via the Feature Analysis Capture module 250. The system may provide functions for pattern classification and detection applications, but the user may also specify associated customized feature processing method(s) during this stage. If the default (supplied) methodologies are selected, the user must specify whether similarity of text strings is to be determined at the syntactic or semantic level (in a parameter named 'TextSimilarity'). Thereafter, the supplied methodologies process the input feature vector as described in the section on Feature Vector Processing below. If a "user-defined" option is selected, the analysis function names for each feature vector are requested, and then assigned function pointers (or interfaces) to an associated procedure. (The user supplied special program code is assumed to be developed and tested independently.)

FIG. 5 shows a sample sequence of three data sets. For this sequence, the method as described in the section on Feature Vector Processing below: (i) generates pattern class P1 for data set #1; (ii) generates pattern class P2 for data set #2; and (iii) adds data set #3 to P1 due to feature similarities. If subsequent data sets are additionally mapped to P1 and the membership count exceeds AlertThreshold, an alert status would be output to the Result Generator 280.

The Vector Merge Function Capture module 260 specifies the child-to-parent vector merge function during the fourth stage of the set-up process. This function determines how a Vector Similarity Metric (VSM) for each feature vector is computed, based on the Element Similarity Measures (ESM) of the individual components as described in the section on Feature Vector Processing below. If the processed vector is a child vector, its VSM is assigned to the corresponding ESM of the parent vector. In a preferred embodiment, a weighted-average function is used to compute the VSM of all feature vectors. The system may also support user-defined methods to compute the VSM, which may be specified during an interactive session with the Vector Merge Function Capture module 260 or in a Configuration file 200.

The fifth and final set-up stage includes collection of application-specific parameters such as: (i) a threshold value for the VSM (named 'ClassThreshold') that specifies when an input pattern may be considered a member of a pattern class; (ii) a threshold value (named 'AlertThreshold') that specifies the count of members in a pattern class above which an alert status is issued; (iii) an output message string when an alert is issued; and (iv) contact information (priority order, instant text messaging IDs, and email addresses). The collection of this data is managed by the Output Parameter Capture module 270.

After the system configuration (stages 1-5 above) is completed, the Pattern Analysis Process Driver 205 continues with the data processing operations. For each input data set, the feature vector is loaded (populated) with corresponding data values, and compared against existing pattern classes as described in the section on Feature Vector Processing below. The degree of membership to each pattern class is computed and stored in Data Store 230. If a particular input pattern generates a VSM value greater than ClassThreshold with respect to a class's prototypical values, that pattern is added as a member of the class. Once the number of members in a particular class exceeds AlertThreshold, an alert status is output to the Result Generator module 280.

The Result Generator module 280 formats an appropriate alert message and forwards it to the User Interface Module 210 and an External Process module 290. The External Process module 290 may handle other operations such as message transmission via instant text messaging or email. If an alert is not issued to human recipients, but is instead used to trigger another process, the External Process module 290 may also handle the transition of control. It is also possible that the main Pattern Analysis Process Driver 205 is initiated by an External Process module 290 as shown in FIG. 2.

Feature Vector Processing

Figure 10:
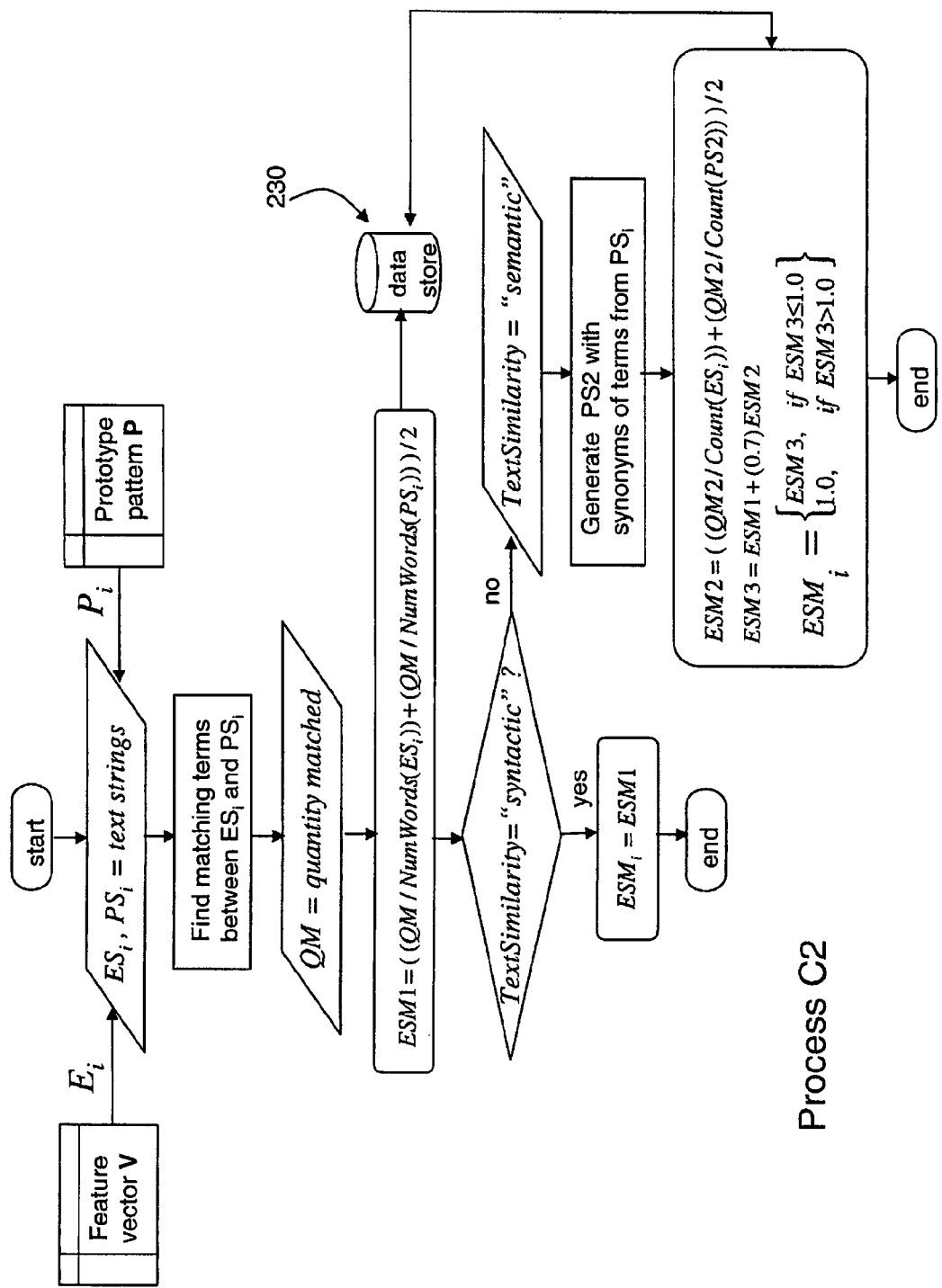
FIG. 10 shows a process which may serve as another part of the feature vector processing method of FIG. 6.

The default (supplied) methodologies for feature vector processing mentioned in stage 3 and invoked by the Pattern Analysis Process Driver 205 are described below, and shown in diagrammatical form in FIG. 6, which illustrates a procedure for feature vector processing according to a preferred embodiment of the invention. This is described below with reference also to FIGS. 7 to 10. of which FIGS. 7 and 10 illustrates processes which may serve as parts of FIG. 6; FIG. 8 illustrates example ESM and VSM computation for sample data; and FIG. 9 illustrates merging and computing a VSM of a base feature vector.

It is assumed that values for 'TextSimilarity' are known either from the Configuration file 200 or interactive user response.

(a) For the first data set (i.e. data for the base feature vector plus all sub-feature vector elements), create a new pattern class and assign the first data set values to be prototypical of that class, since no other comparative data exists.

(b) For each pattern class, compute the prototypical value (class prototype) of its individual feature elements. In one preferred implementation this is: (i) an average value among class members for numerical feature elements; (ii) a cumulative, non-redundant set of string phrases for text feature elements, where known types of word stemming and stop-word removal may also be applied; and (iii) a cumulative, non-redundant set of parameters for feature elements in the format <parameter>=<value>, with corresponding values merged according to method (i) or (ii) above, where <value> is numerical data or text string data respectively.

Steps (c) through (f) below are repeated for each pattern class, where index 'gamma' (y) covers all existing pattern classes:

(c) For each new data set, starting with the lowest (innermost) feature vector, compute the similarity of its elements with the corresponding elements of the class prototype for pattern class y, according to methods described in procedures C1, C2, and C3 below (or corresponding user-defined special processes). The similarity measures of individual feature elements are denoted as Element Similarity Measures (ESMs), and the similarity values with respect to each pattern class are saved in the Data Store 230 with label names in the form "ESM_<vector name>_j_y", where <vector name> is replaced by the current feature vector name assigned during stage 1, j is an index of the element, and y is the pattern class to which the similarity measure was computed (for the same index element). Maximum similarity value is 1.0, for an exact match between two patterns.

(d) Compute the Vector Similarity Metric (VSM) based on the ESM of all the member elements and save the result in the Data Store 230 with label names in the form "VSM_<vector name>_y", where <vector name> is replaced by the current feature vector name assigned during stage 1, and y is the pattern class to which the similarity measure was computed. In one preferred implementation, VSM is computed as the weighted average of the ESM values, where the weight value of each member element was defined during stage 1a. Alternatively, if a user-defined function exists for this process, its methodology is invoked.

(e) If the current feature vector has a parent feature vector, assign its VSM value to the corresponding ESM value of the parent vector. Else, the VSM value is the VSM of the BaseFeatureVector; proceed to step (f). Repeat steps (c) through (e) until VSM of the BaseFeatureVector has been computed.

(f) Store the VSM of the BaseFeatureVector in the Data Store 230 with label names in the form "VSM_<base name>_y" where <base name> is replaced by the name of the BaseFeatureVector.

(g) For the current data set, if the VSM of the BaseFeatureVector is below ClassThreshold for all existing pattern classes, a new pattern class is created and the current data set is assigned as its first member.

(h) Repeat the analysis process starting at step (b) until all data sets have been processed.

Figure 6:
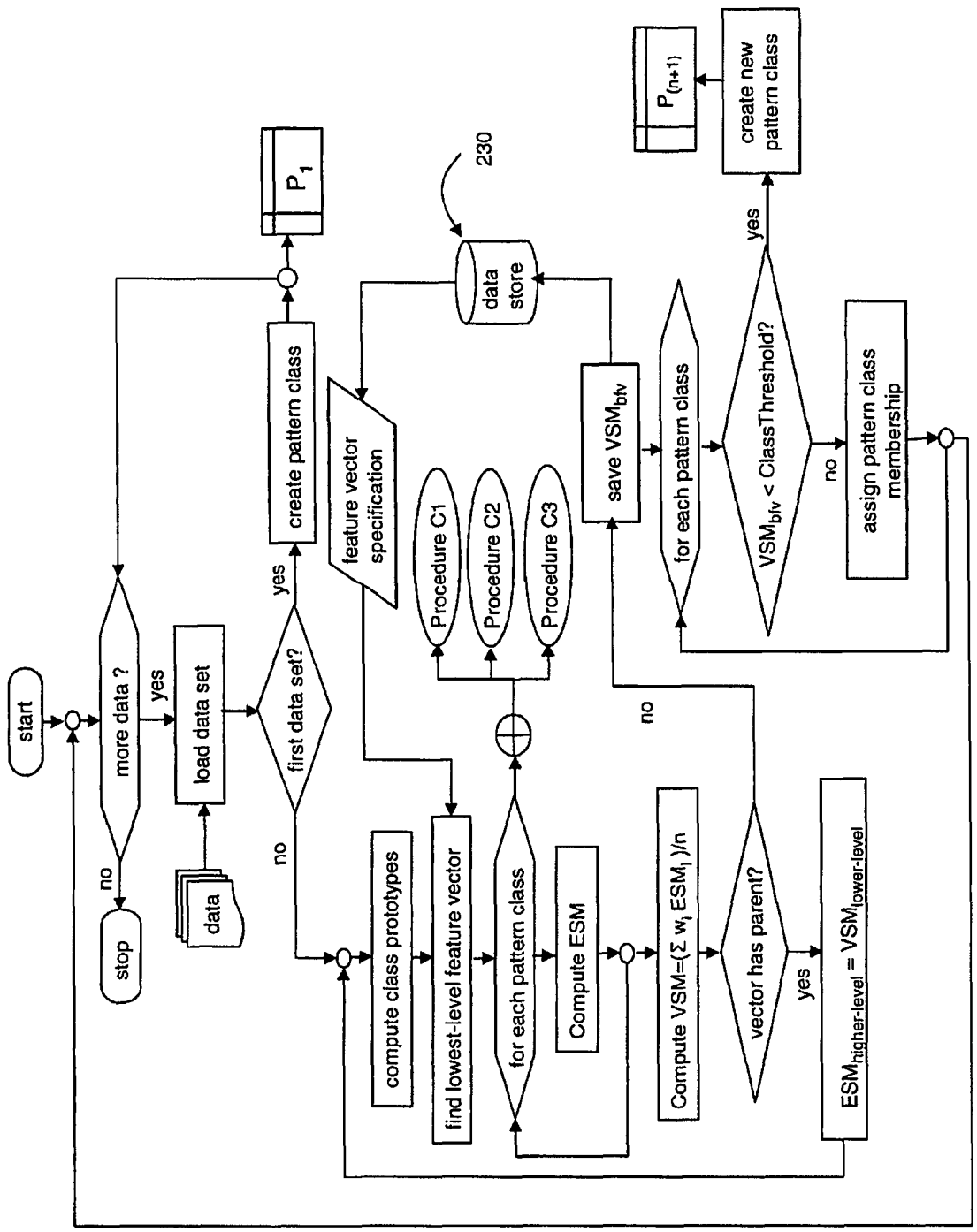
FIG. 6 illustrates a procedure for feature vector processing according to a preferred embodiment of the invention.
Figure 7:
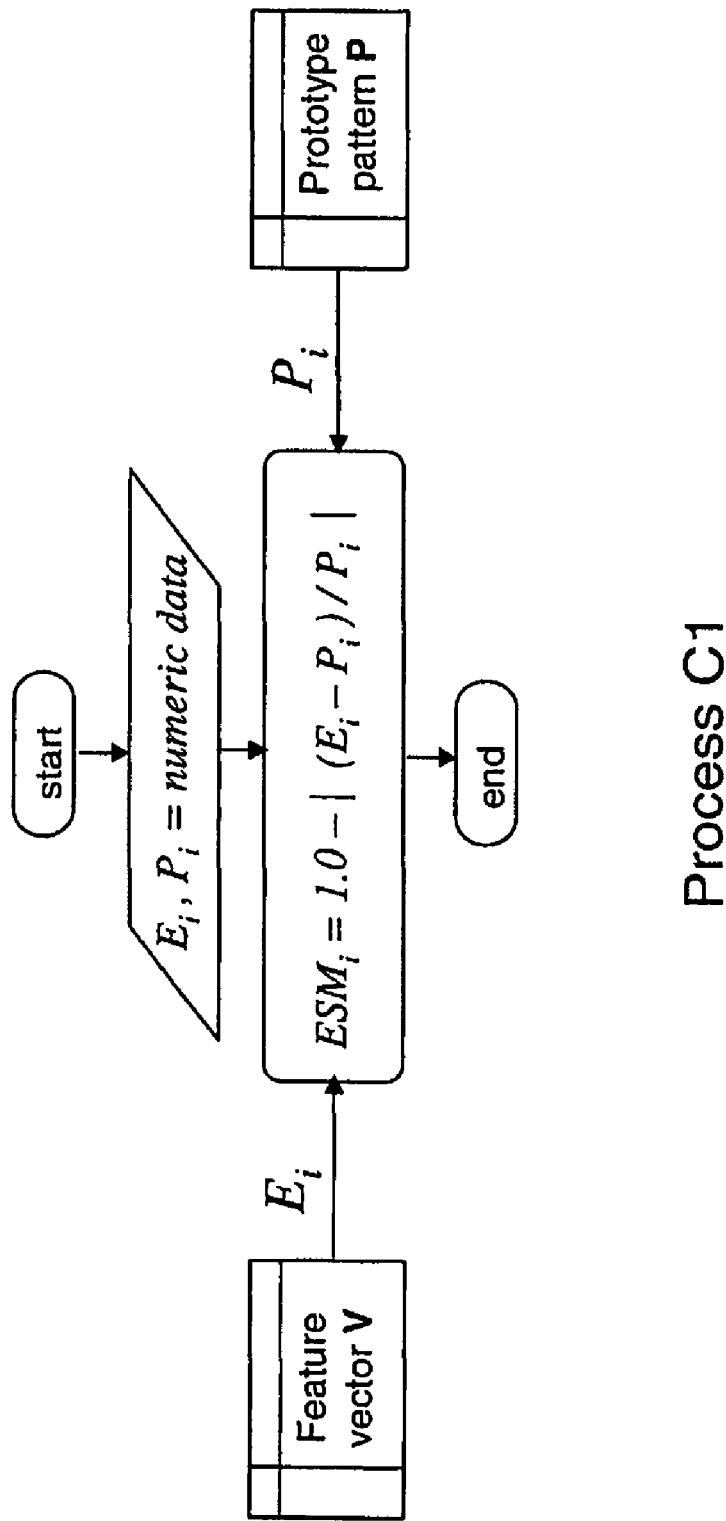
FIG. 7 shows a process which may serve as a part of the feature vector processing method of FIG. 6.

As mentioned above, FIGS. 7 and 10 illustrates processes which may serve as Procedures C1 and C2 respectively in the feature vector processing method shown in FIG. 6. Procedures C1, C2, and C3 are for computing element similarities, and are described below.

(C1) If a feature element is a numeric value $E_i$, its similarity to a class prototype value $P_i$ is computed as an absolute value of the percentage difference in values, i.e.

$$ESM_i = 1.0 - |(E_i - P_i)/P_i|.$$

(C2) If a feature element is a text string ES, its similarity to a class prototype PS is computed as follows. First using prior art methods, stop words are removed from both text strings and the remaining words are stemmed. Next, for each word in ES, a matching term in PS is searched, and total number of matches QM is tallied. Then, $ESM1 = ((QM/NumWords(ES_i)) + (QM/NumWords(PS_i)))/2$, where NumWords(S) is the number of words in a string S. If TextSimilarity is specified to be "syntactic", $ESM_i = ESM1$, and the process ends.

If TextSimilarity is specified to be "semantic", a second vector PS2 is generated containing synonyms of terms from PS, using a synonym generator of known prior art. Next, for each word in ES, a matching term in PS2 is searched, and total number of matches QM2 is tallied.

Then, $ESM2 = ((QM2/NumWords(ES_i)) + (QM2/NumWords(PS2)))/2$, and $$ESM3 = ESM1 + (0.7)ESM2, \text{ and}$$

$$ESM_i = \begin{cases} ESM3, & \text{if } ESM3 \le 1.0 \\ 1.0, & \text{if } ESM3 > 1.0 \end{cases}$$

If semantic aspect of text strings are considered, term matches to words of similar meaning boost the ESM value.

(C3) If a feature element ES is in a form <parameter>=<value>, its similarity to a class prototype PS is computed as the percentage of PS parameters that are the same as ES parameters, without regard to their corresponding data value.

The C3 method above reflects one application preference where the detection of similar data objects (e.g. product type) is given significant priority relative to the detection of the data objects in a similar state (e.g. operational data settings).

It is again noted that if the supplied (built-in) pattern analysis functions are not preferred for a particular application, the user can provide customized procedures for all key processing methods including: data loading, feature analysis, and vector merge operations. The set-up methodology provided in the system may readily accommodates user-defined functions, and the process gracefully degenerates to a single, fixed-length feature vector for simple problems.

References

[1] R. Duda, P. Hart, Pattern Classification and Scene Analysis, John Wiley & Sons, New York, 1973.
[2] J. Tou, R. Goncalez, Pattern Recognition Principles, Addison-Wesley, Reading, Mass., 1974.
[3] J. Schurmann, Pattern Classification: A Unified View of Statistical and Neural Approaches, John Wiley & Sons, New York, 1996.
[4] G. McLachlan, Discriminant analysis and Statistical Pattern Recognition, John Wiley & Sons, New York, 1992.
[5] M. Hearst, "Support vector machines", IEEE Intelligent Systems, pp. 18-28, July/August 1998
[6] K. Fukunaga, Introduction to Statistical Pattern Recognition, second edition, Academic Press, New York, 1990.
[7] Amirghodsi & Sohrab, "Compact color feature vector representation," U.S. Pat. No. 6,961,736, November 2005.
[8] B. Juang, L. Rabiner, "Hidden Markov Models for Speech Recognition," Technometrics, Vol. 33, No. 3, August 1991, pp. 251-272.
[9] Bodén, M. (2002), A guide to recurrent neural networks and backpropagation, in The DALLAS project. Report from the NUTEK-supported project AIS-8: Application of Data Analysis with Learning Systems, 1999-2001. Hoist, A. (ed.), SICS Technical Report T2002:03, SICS, Kista, Sweden
[10] C. Myers, L. Rabiner, "A comparative study of several dynamic time-warping algorithms for connected word recognition," The Bell System Technical Journal, 60(7): 1389-1409, 1981
[11] R. Cooper, "Dynamic Programming: An Overview", http://econ.bu.edu/faculty/cooper/dynprog/introlect.pdf
[12] KMP. Sampath et. al., "Speech Recognition using Neural Networks", University of Moratuwa, Sri Lanka, 2003.
[13] D. Schwarz, "Data-Driven Concatenative Sound Synthesis," Ph.D. Thesis in Acoustics, Computer Science, Signal Processing Applied to Music, Académie de Paris, Pierre et Marie Curie École Doctorale d'Informatique, January 2004.
[14] P. Somervuo, "Self-organization maps for signal and symbol sequences", Ph. D. dissertation, Finish Academy of Technology, December 2000.
[15] T. Kohonen, "The Self Organizing Map", Proceedings of the IEEE, vol 78, no. 9, Sep. 1990.

The invention claimed is:

1. A computer-implemented method for identifying data patterns from data comprising at least one data object, said data having at least one existing pattern class associated therewith, said data object being represented by a base feature vector, at least one of said base feature vectors having a structure of higher-level and lower-level feature vectors such that at least one element of a higher-level feature vector is a lower-level feature vector; said method comprising steps of:
   (a) deriving a pattern class prototype in respect of the or each existing pattern class;
   (b) creating a new pattern class in respect of a data object; and
   (c) deriving a pattern class prototype in respect of said new pattern class,
   for the or each of said existing pattern classes:
      (d1) determining, in respect of elements of a higher-level feature vector, an Element Similarity Measure indicative of a measure of similarity between elements of one or more lower-level feature vectors thereof and corresponding elements of a pattern class prototype of said existing pattern class; and
      (d2) determining, in dependence on said Element Similarity Measures, a Vector Similarity Measure indicative of a measure of similarity between said higher-level feature vector and a corresponding vector of a pattern class prototype of said existing pattern class;
   (e) determining, in dependence on Vector Similarity Measures determined in respect of each of said existing pattern classes and according to predetermined criteria, whether or not said data object is a member of one of said existing pattern classes;
   (f1) in the event of a determination that said data object is a member of an existing pattern class, adding said data object to a set of members of said existing pattern class;
   (f2) in the event of a determination that said data object is not a member of an existing pattern class, generating a new pattern class and adding said data object to a set of members of said new pattern class; and
   (g) identifying any new pattern class so generated to be indicative of a new data pattern;
   wherein one or more of steps (a)-(g) is performed by a computer.

2. A method according to claim 1 wherein at least one data object comprises textual data.

3. A method according to claim 1 wherein at least one data object comprises numerical data.

4. A method according to claim 1 wherein at least one data object comprises textual and numerical data.

5. A method according to claim 4 wherein at least one data object comprises specially formatted textual and numerical data in the form parameter-name=value, wherein parameter-name is a label for a parameter which can hold varying values, and value is one specific value.

6. A method according to claim 1 wherein said base feature vector has a lowest-level feature vector that comprises no non-scalar elements.

7. A method according to claim 1 wherein said base feature vector has at least one lower-level feature vector that comprises at least one non-scalar element.

8. A method according to claim 1 wherein at least one data object is represented by a base feature vector having a structure comprising more than two levels of feature vectors.

9. A method according to claim 8 wherein at least one Vector Similarity Measure determined in relation to a lower-level feature vector in step (d2) is used as an Element Similarity Measure in determining a Vector Similarity Measure in relation to a higher-level feature vector.

10. A method according to claim 1 wherein said data comprises more than one data object.

11. A method according to claim 10, wherein steps (b) to (f2) are performed in respect of each of a plurality of said data objects.

12. A method according to claim 11, wherein steps (b) to (f2) are performed in respect of new data objects in the event that new data objects are added to the data.

13. A method according to claim 11, further comprising a step of providing an indication that a new data pattern has been identified in the event that the set of members of an existing pattern class satisfies a predetermined condition.

14. A method according to claim 1, further comprising a step of providing an indication that a new data pattern has been identified in the event that a new pattern class is generated.

15. A method according to claim 1 further comprising a step of providing an alarm indication in the event that a new pattern class is generated.

16. A method according to claim 1 further comprising a step of providing an alarm indication in the event that the set of members of an existing pattern class satisfies a predetermined condition.

17. A system for identifying data patterns from data comprising at least one data object, said data having at least one existing pattern class associated therewith, said data object being represented by a base feature vector, at least one of said base feature vectors having a structure of higher-level and lower-level feature vectors such that at least one element of a higher-level feature vector is a lower-level feature vector; said system comprising:

means for deriving a pattern class prototype in respect of the or each existing pattern class;

means for creating a new pattern class in respect of a data object; and means for deriving a pattern class prototype in respect of said new pattern class;

means for determining, for the or each of said existing pattern classes:

an Element Similarity Measure in respect of elements of a higher-level feature vector, said Element Similarity Measure being indicative of a measure of similarity between elements of one or more lower-level feature vectors thereof and corresponding elements of a pattern class prototype of said existing pattern class; and a Vector Similarity Measure in dependence on said Element Similarity Measures, said Vector Similarity Measure being indicative of a measure of similarity between said higher-level feature vector and a corresponding vector of a pattern class prototype of said existing pattern class;

means for determining, in dependence on Vector Similarity Measures determined in respect of each of said existing pattern classes and according to predetermined criteria, whether or not said data object is a member of one of said existing pattern classes;

means for adding said data object to a set of members of said existing pattern class in the event of a determination that said data object is a member of an existing pattern class;

means for generating a new pattern class and adding said data object to a set of members of said new pattern class in the event of a determination that said data object is not a member of an existing pattern class; and means for identifying any new pattern class so generated to be indicative of a new data pattern.

* * * * *